L. MEDIAVILLA AND J. L. CANALES.
BORING BAR.
APPLICATION FILED MAY 22, 1918.
1,346,230.
Patented July 13, 1920.
4 SHEETS—SHEET 1.
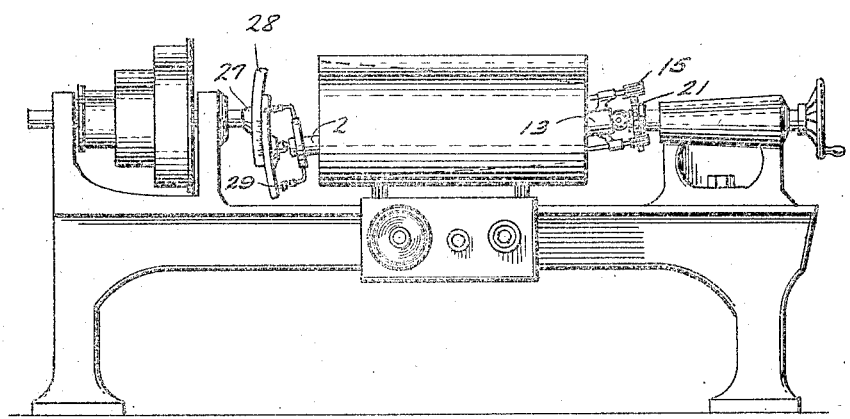
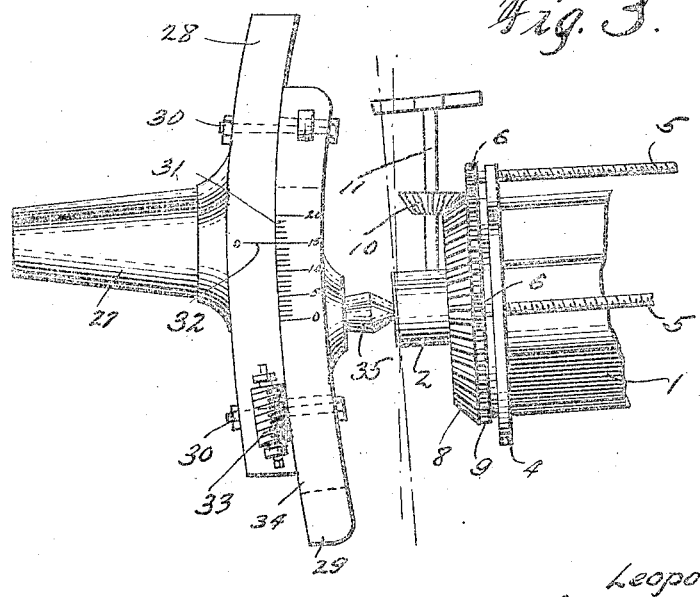
INVENTOR
Leopoldo Mediavilla
& John. L Canales
WITNESSES
BY
ATTORNEY L. MEDIAVILLA AND J. L. CANALES.
BORING BAR.
APPLICATION FILED MAY 22, 1918.
1,346,230.
Patented July 13, 1920.
4 SHEETS—SHEET 2.
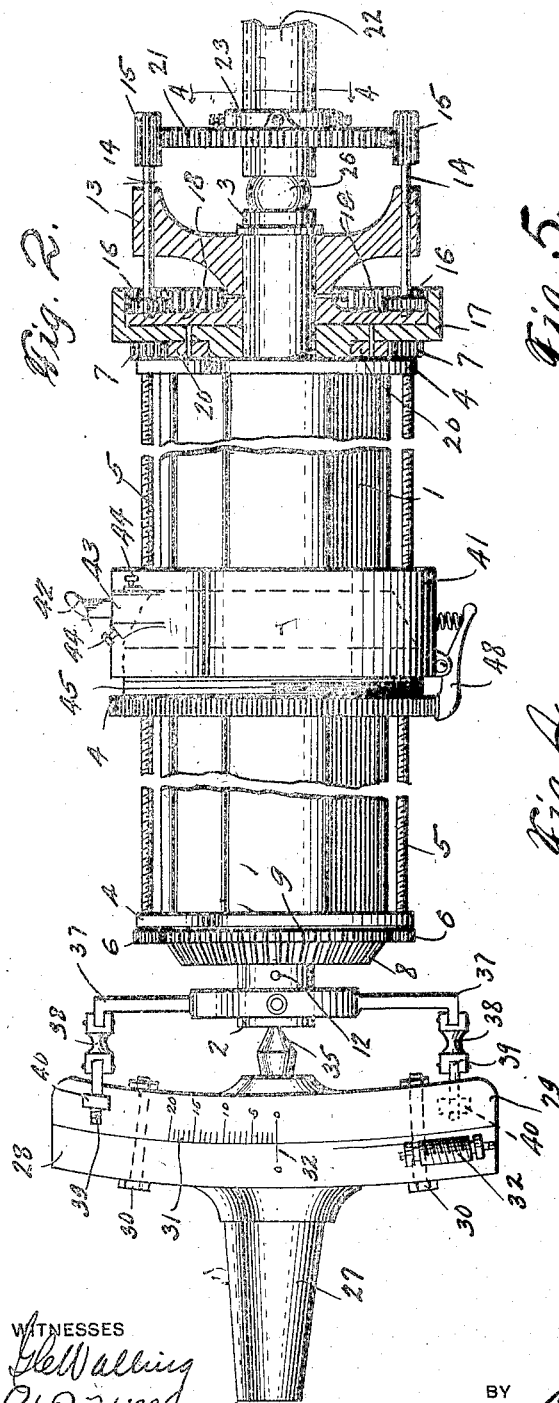
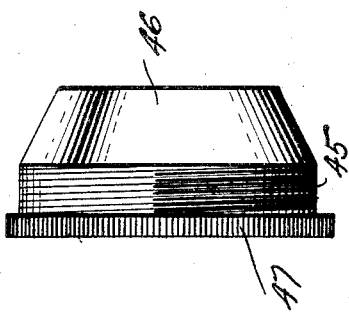
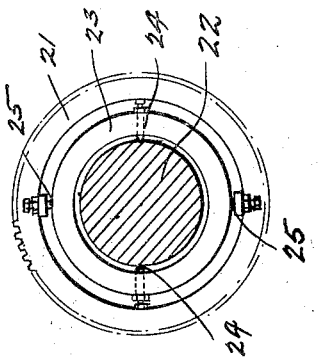
INVENTOR
Leopoldo Mediavilla
& John L. Canales
WITNESSES
BY
ATTORNEY L. MEDIAVILLA AND J. L. CANALES.
BORING BAR.
APPLICATION FILED MAY 22, 1918.
1,346,230.
Patented July 13, 1920.
4 SHEETS—SHEET 3.
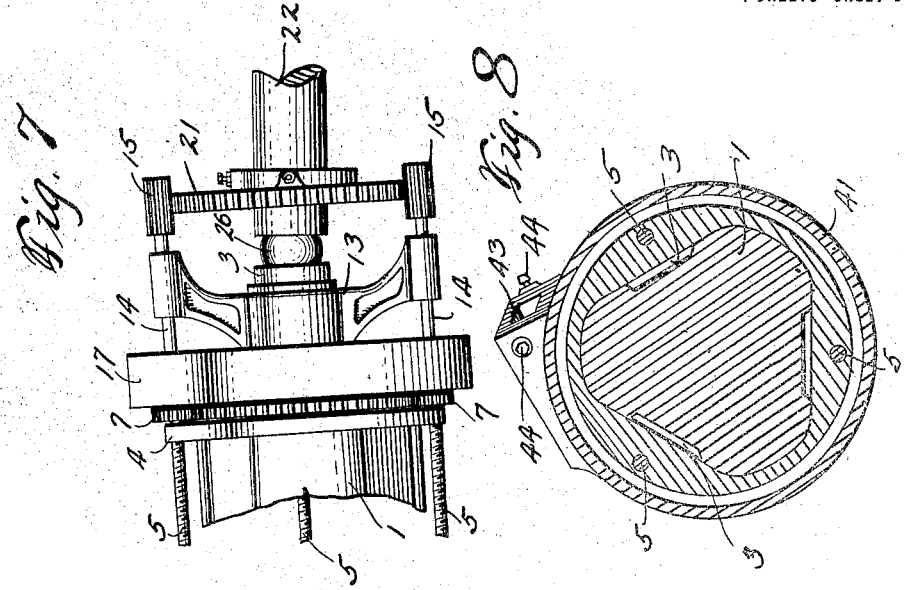
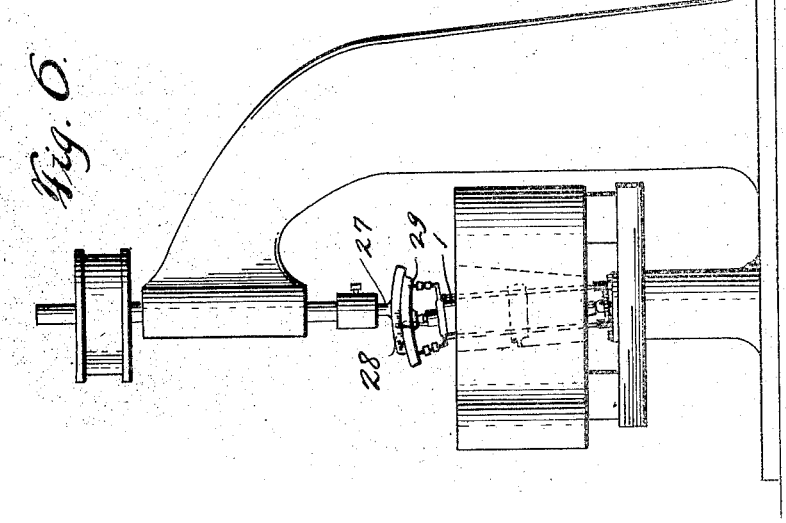
WITNESSES
INVENTOR
Leopoldo Mediavilla &
John L Canales
BY
ATTORNEY

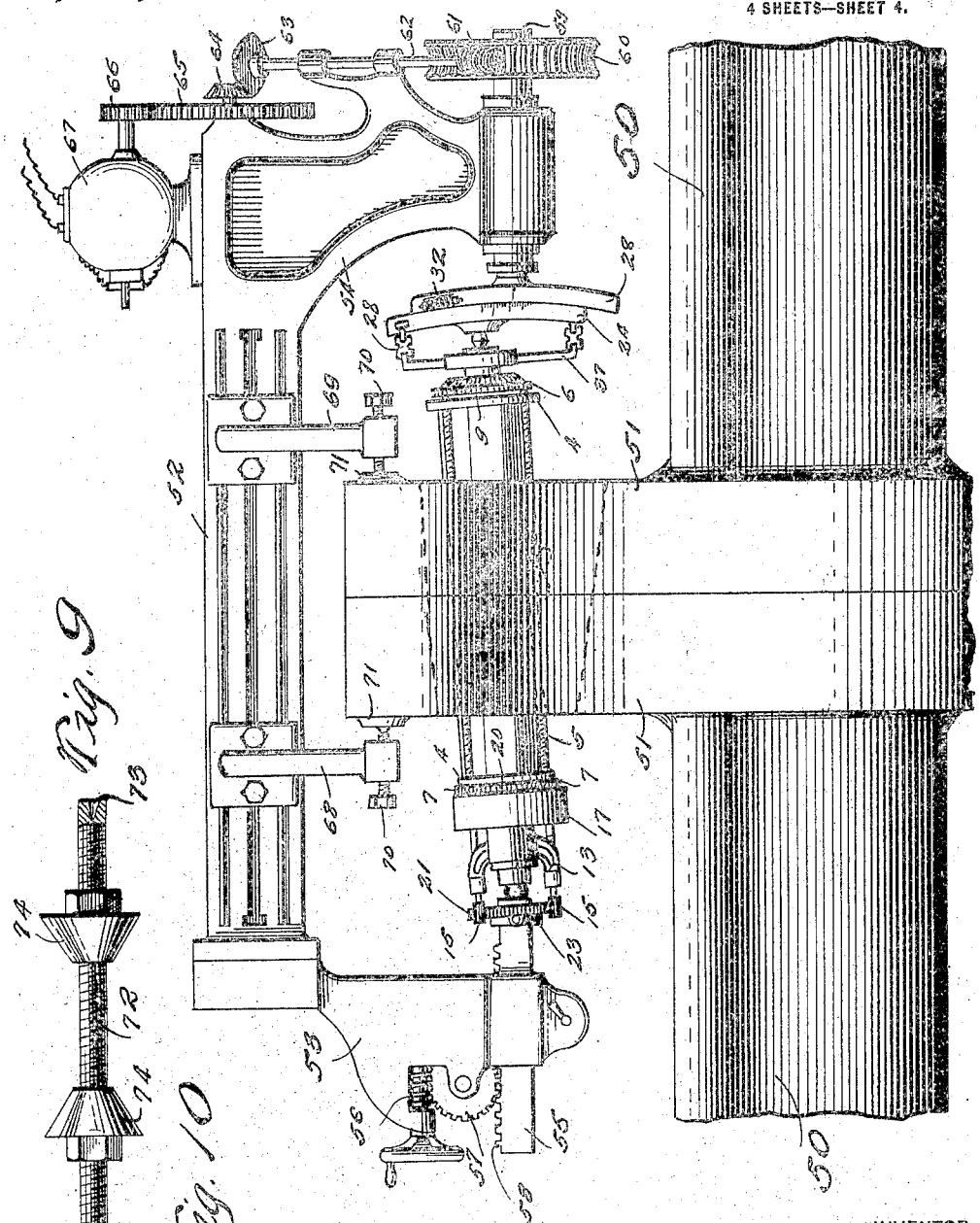

UNITED STATES PATENT OFFICE.

LEOPOLDO MEDIAVILLA AND JOHN L. CANALES, OF NEW YORK, N. Y.

BORING-BAR.

1,346,230.

Specification of Letters Patent.

Patented July 13, 1920.

Application filed May 22, 1918. Serial No. 236,005.

*To all whom it may concern:*

Be it known that we, LEOPOLDO MEDIAVILLA and JOHN L. CANALES, subjects of the King of Spain, residing at New York city, in the county of New York and State of New York, have invented certain new and useful Improvements in Boring-Bars, of which the following is a specification.

The primary object of this invention is to provide a tool which may be used for boring the openings in the flanges of propeller shafts of ships and which may be mounted on the shaft, or used on a lathe, drill press, milling machine, or other mechanism designed for boring, reaming, threading, planing or the like.

The invention provides a tool of the charter specified which may be operated by one workman, thereby enabling the work to be performed in less time and at a considerable less expense than by means generally employed for accomplishing like work.

The invention furthermore has for its object the provision of a tool which may be advantageously employed on cylindrical work and on conical or tapering work and which may be equally well fitted directly to the work, or to a lathe, or applied to a drill press or milling machine.

A further purpose of the invention is the provision of a tool which may be quickly and accurately adjusted to bore an opening, whether of uniform diameter throughout its length, or whether of tapering form, the tool being of such construction as to operate with equal precision and effectiveness on any nature of work.

The invention furthermore is designed to provide a tool for the purpose herein specified which may be depended upon and which may be easily adjusted according to the nature of the work to be performed, the tool having universal or gimbal joints at opposite ends, whereby it is readily adaptable to various adjustments.

The drawing illustrates a preferred embodiment of the invention, however, it is to be understood that in adapting the same to meet different conditions, various changes in the form, proportion, and minor details of construction may be resorted to without departing from the nature of the invention as claimed hereinafter.

In the drawings:—

Figure 1 is a front view of a lathe having a tool in position embodying the invention, Fig. 2 is a front view of the tool parts being broken away and parts in section, the several elements being illustrated on a larger scale, Fig. 3 is a detail view of the head or driving end of the tool, the dotted lines showing means for operating the cutter head by hand, Fig. 4 is a sectional detail on the line 4—4 of Fig. 2 looking to the left showing the means whereby the master gear is connected to the journal by means of a universal or gimbal joint, Fig. 5 is a detail view in elevation of the nut whereby the cutter is adjusted, Fig. 6 is a detail view showing the invention applied to a drill press, Fig. 7 is a detail view of the tail end of the tool, Fig. 8 is a sectional detail of the mandrel and cutter head, the cutter or tool being omitted, Fig. 9 is a detail view of the centering means whereby the tool mounting or carrier may be properly adjusted on the shaft, and Fig. 10 is a detail view showing the tool mounted on the propeller shaft of a ship and adapted for boring the openings in the flanges of the propeller shaft sections.

Corresponding and like parts are referred to in the following description and indicated in the several views of the drawings by like reference characters.

The tool comprises a mandrel 1 which may be of any length and cross sectional outline. This mandrel is provided with opposite ends with journals 2 and 3. It is important that the mandrel be of non-circular outline in cross section so as to cause the cutter head mounted thereon to rotate therewith. As shown most clearly in Fig. 8 the mandrel is approximately of triangular form in cross section and its sides are channeled as indicated at 3, so as to reduce the surfaces in contact. Outer flanges 4 are provided at the ends of the mandrel and constitute means for supporting a plurality of shafts 5. The shafts 5 are threaded throughout their length and their ends project beyond the flanges 4 and receive pinions 6 and 7. A gear wheel is loose on the journal 2 and comprises bevel teeth 8 and lateral spur teeth 9, the latter meshing with the teeth of the pinions 6. The bevel teeth 8 adapted to mesh with the teeth of a pinion 10 secured to a shaft 11, the inner end of which is adapted to be inserted in an opening 12 formed in the journal 2. The elements 10 and 11 constitute parts of a wrench by means of which the gear wheels 8 and 9 may be rotated when it is desired to rotate the shafts 5 to effect movement of the cutter head mounted upon the mandrel 1.

The tail end of the mandrel 1 is provided with the journal 3 and receives a head 13, the same being secured to the journal 3 to rotate therewith and with the mandrel. Shafts 14 are mounted in the head 13 parallel with one another and with the axis of the mandrel. The shafts 14 are provided at their outer ends with relatively long pinions 15 and at their inner ends with pinions 16. An internally toothed gear wheel 17 is loose upon the journal 3 and is confined between the head 13 and the adjacent end of the mandrel 1. The internally toothed rim or lateral flange, of the gear wheel 17 embraces a circular or disk like portion 18 of the head 13. This is indicated most clearly in Fig. 2. The inner ends of the shafts 14 are journaled in the disk portion 18 of the head 13, thereby holding the pinions 16 in proper meshing relation with the internally toothed portion 19 of the gear wheel 17.

An externally toothed ring 20 is secured to the inner face of the gear wheel 17 adjacent the mandrel and is in meshing relation with the pinions 7 so as to impart rotary movement to the shafts 5 when the tool is in operation and the gear wheel 17 has a relatively rotary movement imparted thereto. The pinions 7 are in mesh with a master gear 21 which is connected to a shaft or like part 22 by means of a universal or gimbal joint. A ring 23 is secured to the shaft 22 at diametrically opposite points as indicated at 24. The master gear 21 is connected to the ring 23 at diametrically opposite points 25. The points 25 are set quartering to the points 24 hence the master gear may maintain a position parallel with the head 13 at any angular adjustment of the axis of the mandrel to the axis of the shaft 22. The shaft 22 is non-rotatable and in the case of a lathe, constitutes the spindle of the tail stock, the same being longitudinally adjustable in a manner well understood. A ball 26 is interposed between the journal 3 and the shaft 22, and constitutes a universal bearing and serves to center the tail end of the mandrel with reference to the spindle or shaft 22 of the tail stock.

A shaft or like part 27 is provided with a cross head 28. The outer face of the cross head 28 is formed on the arc of a circle whose center coincides with the center of the ball 26. A supplemental head 29 is disposed in coöperative relation with the head 28, and is adjustable thereon and secured in the adjusted position by means of bolts 30 or like fastening means. The bolts 30 are supported in one of the parts and the remaining part is longitudinally slotted to provide for the relative adjustment of the heads 28 and 29. The outer face of the head 29 is formed on the arc of a circle whose center coincides with the center of the ball 26. In practice, the bolts 30 are supported in openings formed in the head 28 and operate in longitudinal slots formed in the supplementary head 29. To provide for adjustment of the head 29 the latter is suitably calibrated and is provided with scale graduations 31, which coöperate with an index 32 on the head 28. The head 29 is moved, preferably by means of a worm 33 which is mounted on an end portion of the head 28 and engages worm segments 34 on the convex face of the supplementary head 29. The worm 33 is adapted to be rotated by means of a suitable key, (not shown).

A center 35 is carried by the head 29 and is adapted to engage a countersink in the end of the journal 2. Coupling means connect the journal 2 with the head 29, the same comprising a ring 37 with rods 39 which have screw thread connection with the lugs 40 provided at the ends of the head 29 and on opposite sides thereof. The ring 36 is connected with the journal 2 in a manner similar to the connection between the master gear 21 and the shaft 22, whereby provision is had for driving the mandrel from the head 28 whether the axis of the mandrel and part 27 are in line, or at any relative adjusted angle. It will thus be understood that it is essential to provide a universal or gimbal joint between the ring 36 and the journal 2, so as to admit of proper working of the connection or coupling means between the head 29 and the mandrel.

The cutter head 41 slidably mounted on the mandrel 1 is adapted to receive a suitable cutting tool 42, the latter being adjustable to admit of the thickness of the cut being regulated. The cutter head 41 is provided on a side with a socket 43 in which the cutting tool 42 is mounted and adapted to be secured by screws or like fastening means 44 let into opposite sides of the socket. The cutting tool 42 may be adjusted to a nicety by means of a nut 45, which is threaded into the cutter head 41 and has its inner end made tapering as indicated at 46. The outer end of the nut 45 has a milled flange 47 for the two fold purpose of enabling a firm grip to be retained upon the nut when rotating the same, and also to coöperate with a dog 48 by means of which the nut is made secure in the adjusted position. The dog 48 is mounted upon the cutter head and one end is toothed or otherwise constructed to make positive engagement with the milled portion of the nut. In this manner, the nut is held against casual movement when adjusted.

The part 27 is adapted to have the driving force applied thereto and may constitute the spindle of the head stock of a lathe. When the main and supplementary heads 28 and 29 are in line as indicated in Fig. 2, the axes of the shafts or parts 22 and 27 coincide with the axis of the mandrel, hence the tool is adapted for parallel work, that is, it will bore an opening so that the latter may be of uniform diameter throughout its length. By moving the supplementary head 29 to throw the axis of the center 35 away from the axis of the part 27 as indicated most clearly in Fig. 3, the tool is adapted for boring a conical or tapering opening, the degree of the taper depending upon the departure of the center from the axis of the part 27. It is to be understood that the tool may be used in connection with a lathe as indicated in Fig. 1, or with a drill press, as shown in Fig. 6, or it may be employed in any other type of mechanism using a cutter head. When the tool is in operative position the mandrel is rotated by means of the driving force applied to the head 29, the same being transmitted from the head 29 to the journal, by means of the intermediate connection as herein specified. Rotary motion being imparted to the mandrel, the cutter head is caused to rotate therewith as will be readily understood. As the mandrel rotates, a corresponding rotary movement is imparted to the head 13 connected therewith, thereby causing the shafts 14 to travel about the shaft 22, and the pinions 15 being in meshing relation with the master gear 21, a rotary movement is imparted to the shafts 14 simultaneously with their travel about the master gear. The rotation of the shafts 14 impart a corresponding rotary movement of the gear wheels 17 and the latter causes the shaft 5 to rotate through the instrumentality of the gear elements 20 and 7. The shafts 5 being threaded throughout their length and having screw thread connection with the cutter head 41 causes the latter to travel on the mandrel advancing the cutting tool to the work. When it is required to return the cutter head to a given position or to move the same independently of the driving power, the wrench shown by dotted lines in Fig. 3, is placed in position, thereby admitting of the shafts 5 being rotated through the instrumentality of the gear member 8—9.

When the tool is to be used for boring the flanges of a propeller shaft it is mounted directly on the flanges, as shown most clearly in Fig. 10. In this view the sections of the propeller shaft are indicated by the numeral 50 and the flanges thereof by the numeral 51. These flanges are provided with bolt openings in the usual manner and when such openings are to be reamed to properly receive the bolts considerable time, labor, trouble and expense are experienced in performing such work in the usual way and by the accustomed means. This invention enables the work to be easily, conveniently, economically and quickly accomplished.

The mounting, a holder for the tool, comprises a frame 52 having offstanding arms 53 and 54 at opposite ends. A supporting member 55 is slidably mounted in the arm 53 and is adapted to be actuated by means of suitable gearing, such as, worm 56, worm wheel 57 and rack teeth 58 along a side of the member 55.

The arm 54 is provided with a spindle 59 to the outer end of which is secured a worm wheel 60. A worm 61 at one end of a shaft 62 is in mesh with the worm wheel 60. A bevel gear 63 at the opposite end of the shaft 62 is in mesh with a bevel gear 64 rotatable with a spur gear 65 in mesh with a pinion 66 on the end of the shaft of a motor 67 mounted on the frame 52. The tool is rotated by means of the spindle 59 and is supported between such spindle and the member 55 by means of the parts 23 and 28 in the manner therein stated.

The mounting is retained in place by clamp means comprising arms 68 and 69 adjustably secured to the frame 52 and screws 70 threaded in the ends of the arms. Each of the screws 70 has a plate 71 at its inner end and the flanges 51 are gripped between the plates 71.

The tool mounting or holder must be properly adjusted on the shaft. This is effected by means of the centering device shown in Fig. 9, the same consisting of a threaded rod 72 having recesses 73 in its ends and conical plugs 74 mounted on the rod. This centering device is applied as follows: The rod 72 is passed through the registering openings of the flanges 51 after which the conical plugs are screwed up until their smaller ends are firmly entered in the openings of the flanges, thereby centering the rod 72. The holder or tool mounting is now fitted to the rod 72 by having centers of the parts 55 and 59 fitted in the recesses 73 of the rod 72. The mounting is now made secure by turning up the clamp screws 70. After the mounting has been made fast to the propeller shaft 50 the centering device is removed and the tool placed in position, motion being imparted thereto from the motor 67 through the intermediate gearing.

It will be understood that the work may be effected by a single workman and with ease and despatch, thereby avoiding the loss of time, expense and trouble incident to such work as ordinarily performed.

The foregoing description and the drawings have reference to what may be considered the preferred, or approved forms of our invention. It is to be understood that we may make such changes in construction and arrangement and combination of parts, materials, dimensions, et cetera, as may prove expedient and fall within the scope of the appended claims.

Having thus fully described our invention, what we claim as new and desire to secure by Letters Patent, is:—

1. In combination, a mandrel adapted to be angularly adjustable, a cutter head rotatable with the mandrel and adjustable thereon, a feed screw mounted on the mandrel and in engagement with the cutter head, a fixed shaft, a gear element mounted on the fixed shaft and having a universal joint connection therewith, and means between the gear element and the feed screw for imparting rotary movement to the latter as the mandrel is rotated.

2. A tool of the character specified, comprising a mandrel provided at opposite ends with journals, a cutter head adjustable on the mandrel, feed screws mounted on the mandrel and in engagement with the cutter head, pinions at opposite ends of the feed screws, a gear element loose on one of the journals and in mesh with the pinions on the adjacent ends of the feed screws, a gear element loose on the journal at the opposite end of the mandrel and in mesh with the pinions on the adjacent ends of the feed screws, a head secured to the journal, shafts mounted in such head and having pinions at their inner ends in mesh with the gear element loose upon the journal and pinions at the outer ends of the said shafts and a gear in mesh with both of said last mentioned pinions.

3. A boring bar comprising a pair of shafts, a crosshead slidable transversely on one shaft, a mandrel mounted between the shafts, a pivot on said cross head supporting one end of the mandrel, a spherical member disposed between the opposite end of the mandrel and the adjacent shaft to provide a universal connection, a cutting mechanism mounted upon the mandrel and a gearing connection between said mandrel and the end of the shaft having the universal connection for rotating the mandrel.

4. A boring bar comprising a pair of shafts substantially in alinement, a mandrel disposed therebetween, a pivot on one shaft to pivotally support the adjacent end of the mandrel, a pair of feed screws carried by said mandrel, a pinion carried by one end of each feed screw, a gear loosely mounted on the mandrel having connected both of said pinions, an internal gear formed with said first mentioned gear, a cross head carried by the gears, a pair of shafts mounted in said cross head, a pinion on the inner end of each of said shafts for meshing engagement with the internal gear, a pinion on the opposite end of each of said shafts, and a third gear mounted on one of the shafts for meshing engagement with said last mentioned pinion.

5. A boring bar comprising a pair of shafts, a mandrel mounted therebetween, a universal connection between one end of the mandrel and its adjacent shaft, an arcuate cross head formed with the other shaft, a second arcuate cross head slidably mounted upon the first cross head for oscillation in the path of a circle concentric with the center of oscillation of the universal connection, a pivot carried by the second cross head for supporting the adjacent end of the mandrel, a ring surrounding the mandrel, a gimbal joint connection between the ring and mandrel, a pair of oppositely extending arms carried by the ring, and a linked connection between the end of each arm and the second mentioned cross head.

6. In a boring bar, a mandrel, a pair of feed screws, carried thereby, a nut having a pair of openings to threadedly receive the feed screws, a knurled edge on said nut, a conical terminal on said nut, a tool holder having a conical recess to recess the conical end of a nut, means on the tool holder for supporting a tool, and a latch pivotally mounted upon the tool holder and adapted to engage the knurled edge of the nut to prevent relative movement of said nut and tool holder.

In testimony whereof we affix our signatures in presence of two witnesses.

LEOPOLDO MEDIAVILLA.
JOHN L. CANALES.

Witnesses:
 IDA WOLFF,
 JOHN R. BURCH.